July 15, 1941.  W. A. RIDDELL  2,249,540
FOCUSING STOP FOR SHUTTERS
Filed May 18, 1940  2 Sheets—Sheet 1
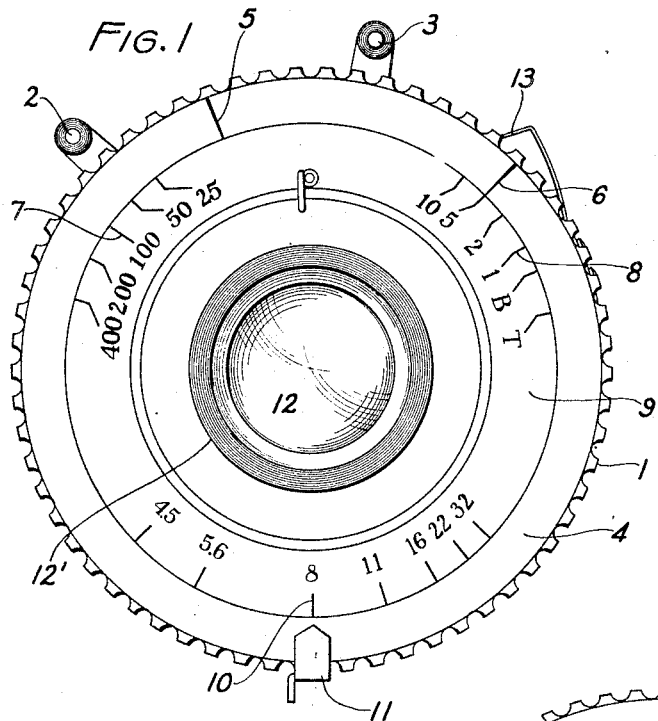
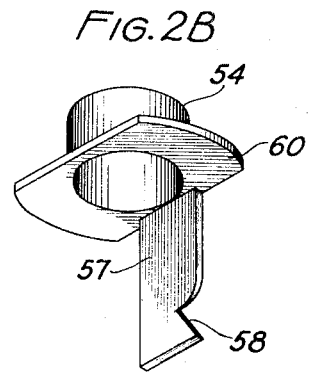
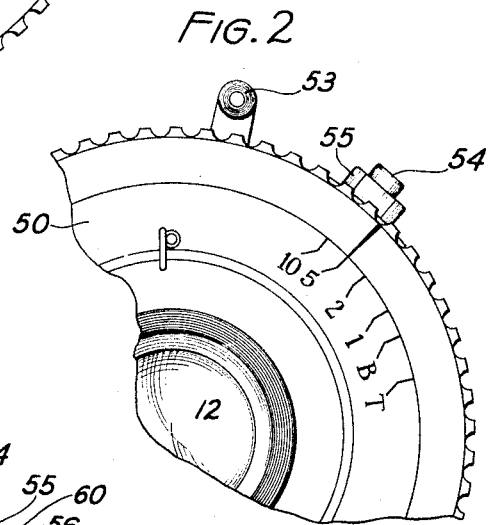
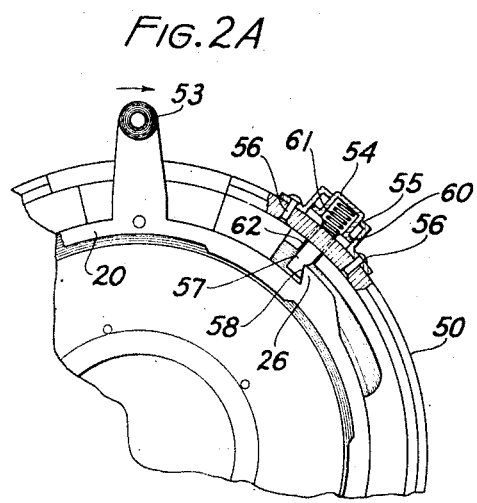
WILLIAM A. RIDDELL
INVENTOR
BY
ATTORNEYS

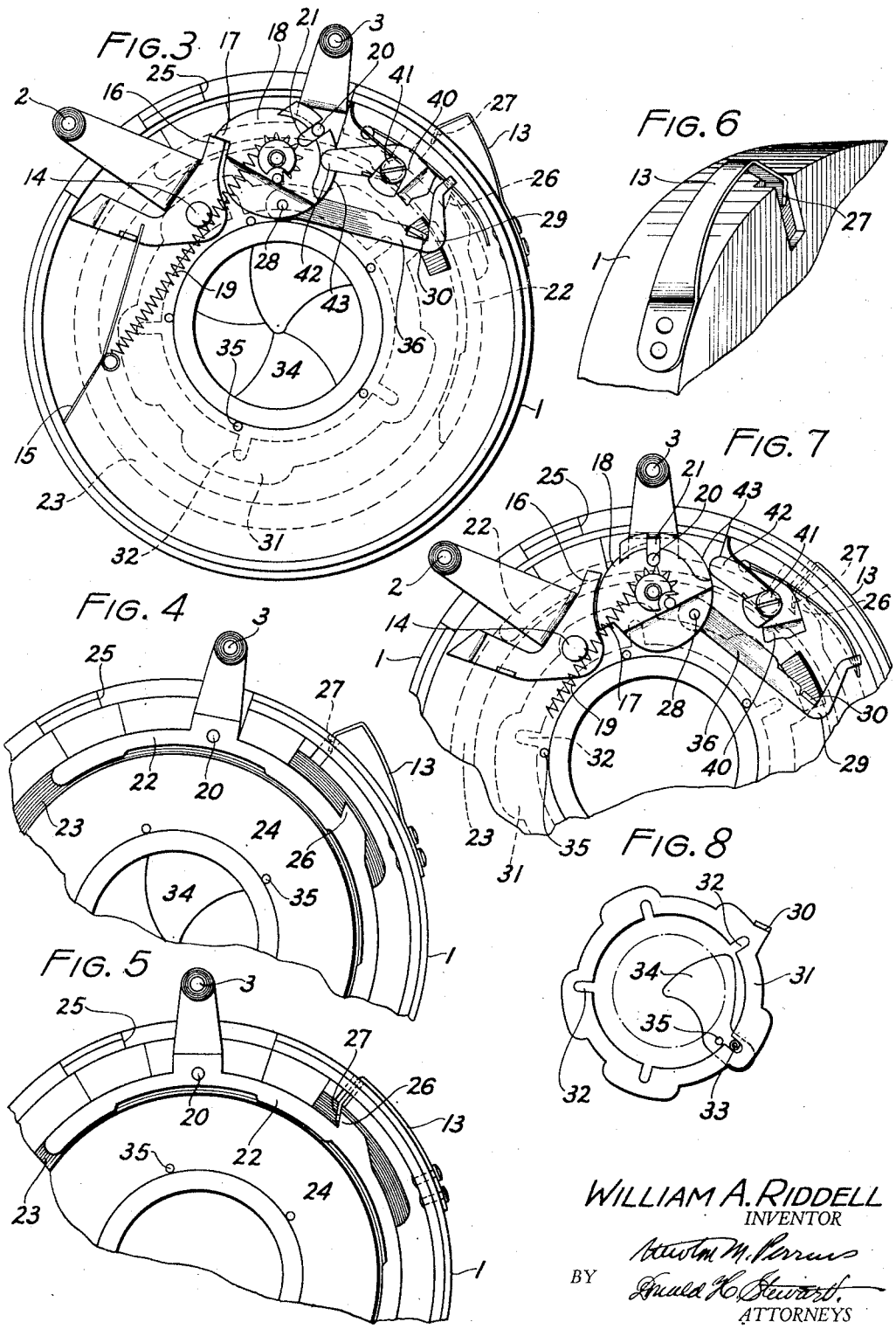

Patented July 15, 1941

2,249,540

UNITED STATES PATENT OFFICE 2,249,540

FOCUSING STOP FOR SHUTTERS

William A. Riddell, Rochester, N. Y., assignor to Eastman Kodak Company, Rochester, N. Y., a corporation of New Jersey Application May 18, 1940, Serial No. 336,063

8 Claims. (Cl. 95—63)

This invention relates to photography and more particularly to time stops for camera shutters. The present application is a continuation-in-part of my application for Focusing stop for shutters, Serial No. 331,845, filed April 26, 1940.

One object of my invention is to provide a shutter with a focusing stop positioned to be manually movable into the path of a part of the shutter operating mechanism for retaining the shutter blades in an open position for focusing. Another object of my invention is to provide a focusing stop which is made of resilient material and which will consequently give slightly when struck by the camera mechanism, thereby eliminating damage to the shutter parts by bringing them suddenly to a stop. Another object of my invention is to provide a focusing stop for shutters mounted radially of a shutter casing and slidable through the shutter casing to and from an operative position in which the shutter blades may be held open for focusing. Still another object of my invention is to provide cooperating latch members in a shutter casing so shaped that the latch members may be held together with the shutter blades open for focusing and in which the blades may be released only when one latch member is moved relative to the other latch member, at which time the focusing stop may be automatically removed to an inoperative position. Other objects will appear from the following specification, the novel features being particularly pointed out in the claims at the end thereof.

Coming now to the drawings wherein reference characters denote like parts throughout:

Fig. 1 is a front elevation of a shutter constructed in accordance with and embodying a preferred form of my invention.

Fig. 2 is a fragmentary front elevation of a shutter showing a second embodiment of my invention.

Fig. 2A is a fragmentary view of the modified form of shutter shown in Fig. 2, the cover plate being removed and parts being shown in section to better illustrate my focusing stop.

Fig. 2B is an enlarged perspective view of the latch element used in the embodiment of my invention shown in Fig. 2.

Fig. 3 is a plan view of a part of the shutter mechanism with the shutter cover removed.

Fig. 4 is a fragmentary view showing a portion of the setting lever and the time stop lever in an inoperative position.

Fig. 5 is a view similar to Fig. 4, but with the time stop in its operative position.

Fig. 6 is a fragmentary detail perspective showing the time stop lever mounted on the shutter casing.

Fig. 7 is a fragmentary detail plan view of a shutter with the shutter blade operating mechanism shown in position to hold the blades open, and Fig. 8 is a fragmentary detail showing a portion of the shutter blade and blade ring.

In cameras taking film packs and plates, it is customary to focus on a ground glass, but when this is done, it is usually necessary to set the shutter for a time exposure, depress the trigger to open the blades, focus on the ground glass, depress the trigger to close the blades, reset the shutter to the selected exposure, and finally make an exposure. All these movements require considerable time and some thought on the part of an operator. The same operations are frequently necessary for cameras of the type used by press photographers and particularly in this type of work, such delay is annoying. My present invention is particularly directed to the elimination of many of these steps necessary in focusing and to permit a shutter to remain at any preselected time setting while the focusing movement is taking place. My invention comprises broadly providing a time stop lever as a separate element normally held out of its operative position but movable into such a position by slight pressure. It is then only necessary to depress the trigger to cause the shutter mechanism to function to open the blades, in which position they will be held by the time stop lever during the focusing movement. When it is desired to release the blades to close, slight pressure applied to the setting lever will permit the time stop lever to spring upwardly into its inoperative position. The setting lever may be moved to again set the shutter, or it may be permitted to completely run down. In either event, no special setting is required for focusing, and the leaves are automatically retained in their open position until positively released.

Referring to Fig. 1, the shutter may be of a well-known type, including a shutter casing 1, having a trigger 2 and a setting lever 3. The periphery of the shutter may carry a knurled ring 4, which may be used for setting either of two pointers 5 or 6 opposite speed graduations 7 or 8 on a time scale, carried by the front plate 9. This plate may also conveniently carry a diaphragm scale 10, there being the usual lever 11 for adjusting the diaphragm in accordance with this scale. As shown in Fig. 1, a front lens element 12 may be carried in a lens cell 12'. The shutter also carried a spring lever 13, which is the time stop lever and which will be hereinafter more fully described.

A second embodiment of my invention is shown in Fig. 2, wherein a portion of the front of a shutter 50 is shown, this shutter being provided with a setting lever 53 and a time stop push button 54, this bush button passing through the ferrule 55 which may be attached to the shutter casing 50 by means of screws or rivets 56. Referring to Fig. 2B, there is a latch member 57 which may have an inclined latch face 58 and the latch member can conveniently be formed of one piece of metal, the upper part 54 constituting a hollow push button and the central part 60 including an outwardly flared flange to limit the movement of the push button 54 relative to the ferrule 55. A coil spring 61 between the inside of the push button 54 and the outside of the shutter case normally thrusts the push button to the position shown in Fig. 2.

The shutter casing 50 is provided with an radial slideway 62 in which the latch member 57 may slide relatively to the shutter, so that when the push button 54 is depressed as in Fig. 2A, it is brought into the arcuate path of the latch member 26, which is carried by the arcuate shoe 20 of the shutter setting member 53, as will be hereinafter more fully described. When the parts are in the position shown in Fig. 2A, the shutter leaves will be in a fully open position for focusing, and by moving the shutter setting member 3 slightly in a clockwise direction to move the latch element 26 away from the latch element 57, the spring 61 is permitted to thrust the push button 54 outwardly, thus moving the latch member 57 into an inoperative position. When in this position, as shown in Fig. 2, it does not interfere with the normal operation of the shutter.

The shutter mechanism in both embodiments of my invention—that is the embodiment shown in Fig. 1 and the embodiment shown in Fig. 2 is the same, insofar as the mechanism which operates the shutter leaves goes and this will now be described. Referring to Fig. 3, showing a preferred embodiment of my invention the shutter casing 1 is shown with the cover plate 9 removed, disclosing a part of the shutter mechanism and, as indicated in this drawing, the trigger 2 may be mounted upon a stud 14 and may be pressed in a clockwise direction by the spring 15, so that the arm 16 may engage latch element 17 on the master member 18, which may be moved by a spring 19 when the master member has been moved to the position shown in Fig. 3. In order to move the master member to this position, the setting lever 3 is moved in a clockwise direction so that the pin 20, through its engagement with the slot 21, will tension the master member.

The setting lever 3, as indicated in Fig. 3, is carried by an arcuate shoe 22 which rides in a groove 23 in the shutter plate 24, this groove being either in the form of a complete ring or extending through an arc sufficiently long to permit the setting lever to move from its inoperative position to the position shown in Fig. 1, the inoperative position being counterclockwise with respect to Fig. 4, so that the lever 3 lies close to the shoulder or stop 25 formed by an edge of the shutter casing 1.

The arcuate shoe 22 is preferably provided with a hook-like latch element 26 which is so positioned that when it is brought into engagement with a downwardly extending arm 27 forming a latch element carried by the time stop 13, it will engage this arm, as indicated in Fig. 5, and will prevent the complete movement of the setting lever 3, and because the setting lever is interconnected with the master member through the pin 20 in the slot 21, it will likewise stop the movement of the master member. through the pin 20 in the slot 21, it will likewise stop the movement of the master member.

The primary difference between the embodiments of my invention shown in Fig. 1 and Fig. 2 is that the action of the second latch elements in each case is different. In the type shown in Fig. 1 and Figs. 3 to 7, the latch element is made from springy material, the spring 13 having a downwardly projecting latch element 27 movable into the path of the latch element 26 in such a manner that when this latch element strikes the latch element 27, this latch element may flex a sufficient distance to prevent a sudden shock to the shutter operating mechanism as it is brought to a stop. With some types of shutters, this is extremely desirable because the mechanism will not withstand a sudden shock when the parts have not moved to completely close the shutter leaves. However, with some shutters, the sudden stopping of the shutter mechanism does no damage, in which case the mechanism shown in Figs. 2, 2A and 2B can be used. In these forms, the latch element 57 is quite rigid and while there is preferably some lost motion between the latch element and its slideway 62, this is generally not sufficient to resiliently ease the shutter leaves to a stop at their fully open position. I, therefore, prefer to provide the resilient type of shutter stop member 27, although, of course, such a resilient stop need not be mounted on a spring arm 13, but could be mounted on a push button 54, as will be obvious to those skilled in the art.

The master member 18 carries a stud 28 pivotally supporting lever 36, having a hook 29 engaging an upstanding lug 30 on the blade ring 31, best shown in Fig. 8. This blade ring is provided with a series of notches 32 each engaging a pin 33 carried by a shutter leaf 34, pivoted at 35 to the shutter casing. Consequently, oscillation of the blade ring 31 causes the blades to open and close.

In the shutter shown, when the setting lever is in the Fig. 5 position and the latch elements 26 and 27 are engaged, the blade ring will have been swung to open the blades. Since the master member cannot move further until the latch 26, 27 is released, the blades will remain in an open position for focusing.

After focusing has been accomplished and it is desired to release the latch 26, 27, a slight clockwise pressure on the lever 3 will permit the spring of the time lever 13 to withdraw the latch element 27 from the path of the lug 26. The normal operation after focusing is merely to swing the lever 3 to its fully set position shown in Fig. 3. This operation automatically releases the latch elements 26 and 27, and the shutter is again ready for any preselected exposure. However, if the operator should desire not to take a picture and would prefer to have the master member untensioned, after a slight clockwise movement of lever 3 to release the latch elements 26, 27, the lever 3 may be permitted to move in a counterclockwise direction, automatically closing the shutter blades.

It is unnecessary to show the particular type of mechanism used for producing retarded exposures because this forms no part of the present invention. However, the duration of the exposures may be controlled by a lever arm 40, pivoted at 41 to the shutter casing and having an end 42 adapted to strike the cam 43 on the master member 18 as it moves under the impulse of spring 14. By adjusting the arm 40 about the pivot 41, the amount of retarding can be accomplished in a known manner.

The operation of this shutter is extremely simple. Assuming that an operator may have selected 1/100 of a second as being the proper exposure, at any desired diaphragm aperture, and that he wishes to focus his camera on the ground glass, the trigger of the set shutter is released while at the same time the operator holds the spring time stop 13 in the depressed position of Fig. 5. The master member immediately opens the blades through the latch 29 and blade ring lug 30, the arcuate shoe 22 moving with the mechanism which moves the shutter blades. Since the arcuate shoe is brought up against the stop 21, the mechanism parts moving with the blade ring will come to a stop with the shutter blades 34 in an open position permitting the focusing operation to be accomplished.

It should be noticed that the shape of the latch elements 26 and 27 is such that the tension of the spring 19 constantly tends to turn the arcuate shoe 22 in a counter-clockwise direction and consequently, firmly holds these latch elements in an operative position.

The focusing having been accomplished, the operator swings the lever 3 in a clockwise direction, immediately releasing the latch elements 26, 27, and permitting the spring time stop 13 to swing outwardly to its Fig. 3 position. This simple operation tensions the shutter for his preset exposure and the exposure can be rapidly made by merely depressing the trigger 2. Thus, any number of exposures can be made without any adjustment being made to the shutter at all, unless the light conditions should change. In the preferred form of my invention, the latch member which stops the movement of the shutter mechanism to focus is made so that it will act as a resilient stop preventing too great a shock to the shutter mechanism. However, I have also illustrated a form in which the latch member is mounted to slide radially in a guide channel which can be used if the shutter is so constructed that the parts will not be damaged by being suddenly stopped when the blades are in a fully open position. In both forms of my invention, the operation is the same—it is only necessary to press one latch member into the path of the other and to operate the shutter to cause the leaves to open, and it is only necessary to move one latch element from the other manually as by moving the setting lever 3 a distance to separate the inclined faces of the stop members to permit their springs to move them to an inoperative position so that the normal type of shutter exposures can be completed.

What I claim is:

1. In a camera shutter, a trigger, shutter mechanism releasable by the trigger for making an exposure including shutter leaves and a blade ring, having, in combination, a shutter setting lever movable with the blade ring when the latter moves in a direction to make an instantaneous exposure, a spring time stop carried by the shutter for manual operation, a latch element projecting from said spring and movable therewith into a position to engage and stop movement of the shutter setting lever when said blade ring has moved therewith to open the shutter blades, and means for releasing the spring time stop by manually moving the setting lever.

2. In a camera shutter of the setting type, the combination with a shutter casing, of a trigger pivotally mounted thereon, a setting lever movably mounted on the shutter casing, shutter blades, a blade ring movably mounted and operably connected to the blades, mechanism for operating the blade ring including a spring adapted to be set by said setting lever for making instantaneous exposures, connections between said mechanism and the blade ring, a time stop movably mounted on the shutter casing and extending thereinto and positioned to move into and out of the path of a part of the shutter mechanism movable with the blade ring as the latter moves to make an exposure, a lug carried by said part of the shutter mechanism positioned to resiliently engage said time stop when moved in the path of said shutter part to stop the movement thereof when said shutter blades are in an open or focusing position.

3. In a camera shutter, a trigger, shutter mechanism releasable by the trigger for making an exposure including shutter leaves and a blade ring, having, in combination, a shutter setting lever movable with the blade ring when the latter moves in a direction to make in instantaneous exposure, a spring time stop carried by the shutter for manual operation, a spring latch element projecting from said spring and movable therewith into a position to engage and stop movement of the shutter setting lever when said blade ring has moved therewith to open the shutter blades, and means for releasing the spring time stop by manually moving the setting lever, the shape of the interengaging lug and time stop being such that the latter is retained by the former in locking position.

4. In a camera shutter of the setting type, the combination with a shutter casing, of a trigger pivotally mounted thereon, a setting lever movably mounted on the shutter casing, shutter blades, a blade ring movably mounted and operably connected to the blades, mechanism for operating the blade ring including a spring adapted to be set by said setting lever for making instantaneous exposures, connections between said mechanism and the blade ring, a time stop movably mounted on the shutter casing and extending thereinto and positioned to move into and out of the path of a part of the shutter mechanism movable with the blade ring as the latter moves to make an exposure, a lug carried by said part of the shutter mechanism positioned to engage said time stop when moved in the path of said shutter part to stop the movement thereof when said shutter blades are in an open or focusing position, said time stop lever including a spring means tending to move said lever out of its operative position whereby said time stop moves from its operative position when said lug is moved from a time stop engaging position.

5. In a camera shutter of the setting type, the combination with a shutter casing, of a trigger pivotally mounted thereon, a setting lever movably mounted on the shutter casing, shutter blades, a blade ring movably mounted and operably connected to the blades, mechanism for operating the blade ring including a spring adapted to be set by said setting lever for making instantaneous exposures, connections between said mechanism and the blade ring, a time stop movably mounted on the shutter casing and including a spring latch element having an inclined surface adapted to be moved through a path of movement, said setting lever including a latch element movable therewith through a curved path intersecting the path of the first mentioned latch element, whereby said latch elements may engage when said time stop is moved and the shutter mechanism operated, the two latch elements being positioned to hold the shutter blades open when said elements engage.

6. In a camera shutter of the setting type, the combination with a shutter casing, of a trigger pivotally mounted thereon, a setting lever movably mounted on the shutter casing, shutter blades, a blade ring movably mounted and operably connected to the blades, mechanism for operating the blade ring including a spring adapted to be set by said setting lever for making instantaneous exposures, connections between said mechanism and the blade ring, a time stop movably mounted on the shutter casing and including a resilient latch element having an inclined surface adapted to be moved through a path of movement, said setting lever including a latch element movable therewith through a curved path intersecting the path of the first mentioned latch element, whereby said latch elements may engage when said time stop is moved and the shutter mechanism operated, the two latch elements being positioned to hold the shutter blades open when said elements engage, and to release said blades when the latch elements are separated, said time stop including a spring for separating the latch elements.

7. In a camera shutter, including a shutter casing, a trigger, shutter mechanism releasable by the trigger for making an exposure including shutter leaves, a blade ring for moving the shutter leaves, a shutter setting lever movable with the blade ring when the latter moves in a direction to make an instantaneous exposure, the combination with a portion of the setting lever moving through an arcuate path and including a latch element thereon, of a second latch element slidably carried by the shutter casing and extending through the shutter casing and movably into and out of the arcuate path of the first mentioned latch element, a push button on the latch element outside of the shutter casing, a spring for holding the latch elements apart, each latch element including inclined interengaging faces adapted to hold the latch elements against the pressure of said spring whereby said latch elements may be released only by moving one latch element from the other a distance to clear the inclined interengaging latch elements.

8. In a camera shutter, including a shutter casing, a trigger, shutter mechanism releasable by the trigger for making an exposure including shutter leaves, a blade ring for moving the shutter leaves, a shutter setting lever movable with the blade ring when the latter moves in a direction to make an instantaneous exposure, the combination with a portion of the setting lever moving through an arcuate path and including a latch element thereon, of a second latch element a radial slideway in the shutter casing supporting the second latch element; an aperture at the end of the slideway in the shutter casing through which the latch element may slide to intercept the path of the first mentioned latch element, a spring exteriorly of the shutter casing normally holding said second latch element in an inoperative position in its guideway, and a handle on the second latch element for moving the second latch element radially and into a position to engage the first latch element when it curves through its path in an actuation of the shutter.

WILLIAM A. RIDDELL.